July 14, 1942.  O. W. RANDOLPH  2,289,727
FEED MILL AND METHOD OF PREPARING ANIMAL FODDER
Filed March 12, 1940   2 Sheets-Sheet 1
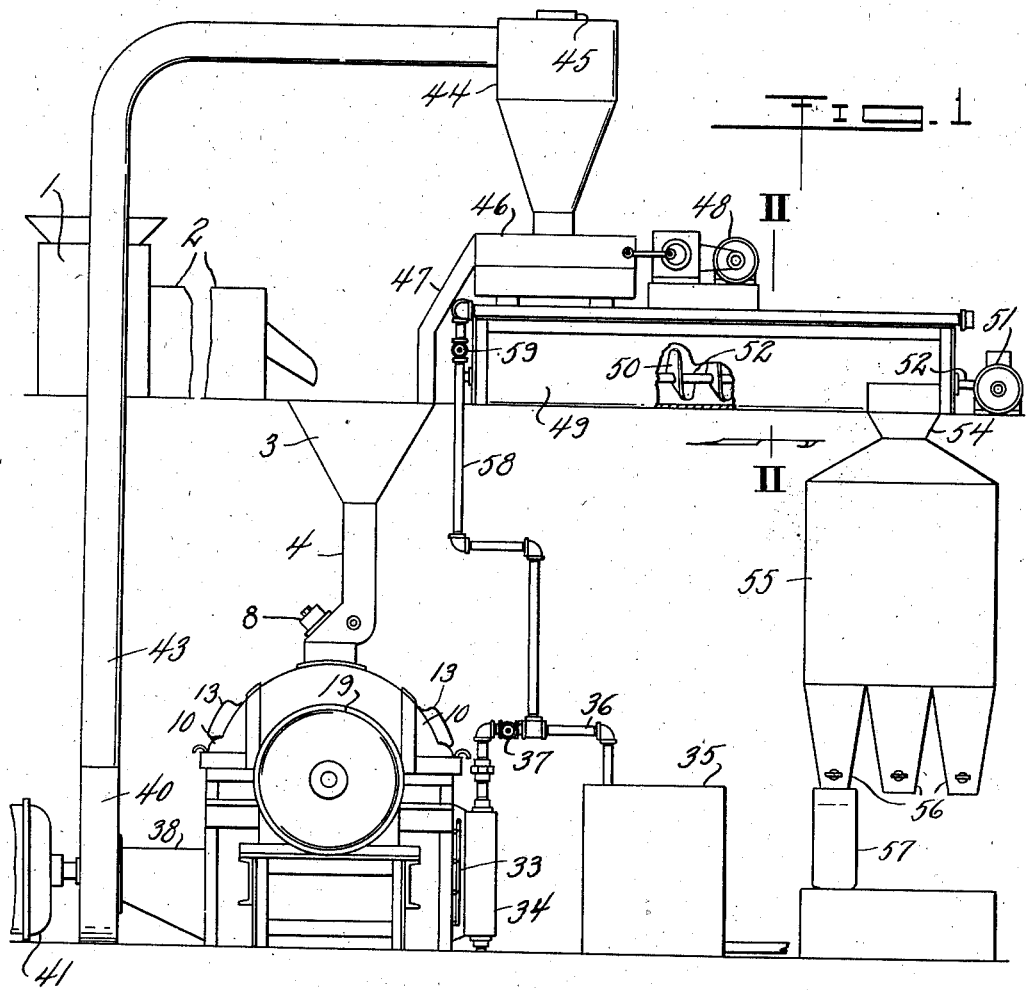
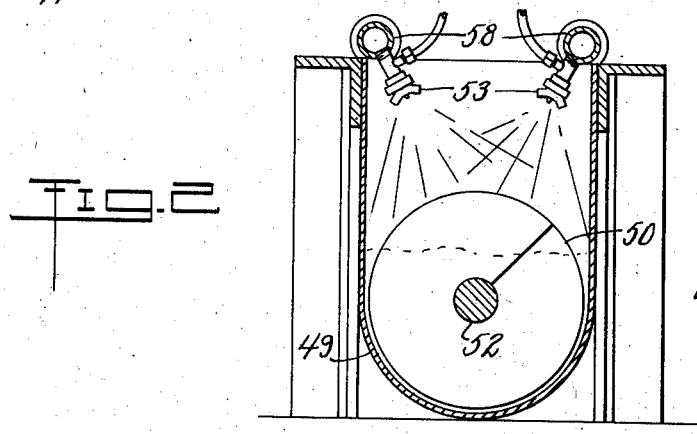
Oliver W. Randolph
Inventor

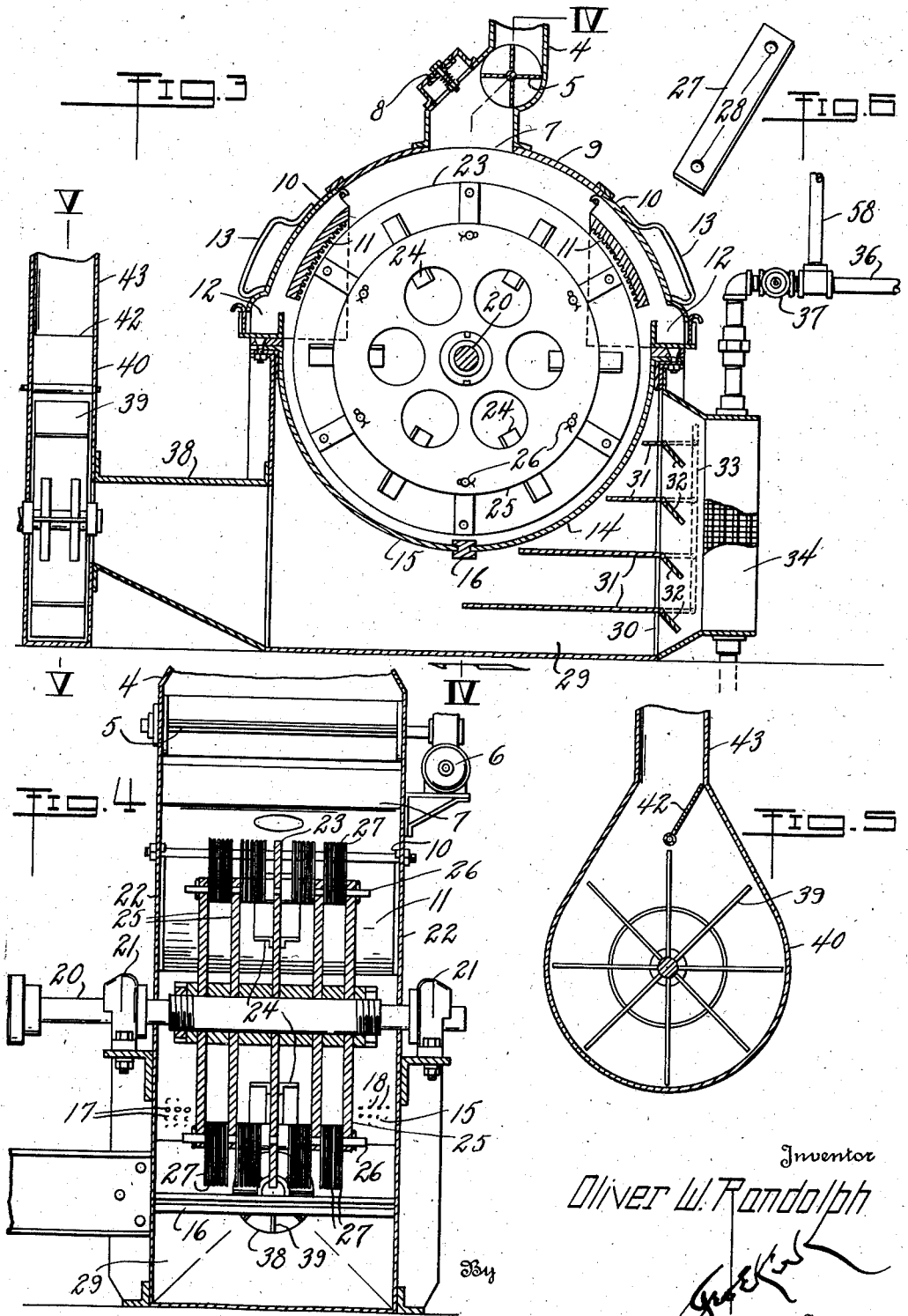

Patented July 14, 1942

2,289,727

UNITED STATES PATENT OFFICE 2,289,727

FEED MILL AND METHOD OF PREPARING ANIMAL FODDER

Oliver W. Randolph, Toledo, Ohio

Application March 12, 1940, Serial No. 323,581

5 Claims. (Cl. 99—8)

This invention relates to conserving values in products and their production.

This invention has utility when incorporated in methods of subdividing with temperature and humidity controls as in a milling stream continuity. An instance is the powdering of dehydrated alfalfa to a stage for storage with desirable "Carotin" properties therefor.

Referring to the drawings:

Fig. 1 is a partially schematic and partially broken away view of an installation carrying out the purposes herein disclosed, say for handling green alfalfa from the field to bags;

Fig. 2 is a section on the line II—II, Fig. 1, showing the humidity or fog moisture supply to the subdivided or powdered alfalfa meal;

Fig. 3 is a transverse section, with parts broken away, of the hammer mill and draft connections thereto;

Fig. 4 is a section on the line IV—IV, Fig. 3, of the hammer mill and discharge way therefrom;

Fig. 5 is a section on the line V—V, Fig. 3, of the pneumatic elevator or induced draft promoting means for the hammer mill; and Fig. 6 is a detail view of one of the blades or hammers of the hammer mill which may be mounted in its various positions to wear off each of the four corners, which mill may be run in either direction.

From the field, the vegetation, say alfalfa of green growth of as much as 8 to 10 inches high, as cut may be brought in and at chopper 1 be reduced in length to 2 inches. This chopped green alfalfa may then, as a continuous process, be run through dehydrator 2, wherein direct heat thereto is supplied short of combustion with effectiveness for removing moisture therefrom to the range of approximately a dryness of as low as 5 per cent. This chopped or short length dehydrated alfalfa from the dehydrator 2 may pass by hopper 3 to chute 4, wherein supply valve 5 driven by motor 6 may operate at slow speed for delivering of this stock by way of port 7 (Fig. 3). Intake check valve 8 allows this supply of material as extending the full way across cylindrical top 9 of a hammer mill. From this cylindrical top 9, the mill has removable upper side sections 10 carrying roughened or abrasion-promoting portions 11. Therefrom troughs 12 serve as receivers for the heavier gravity foreign matter.

By releasing the respective sections 10 from the shell 9, handles 13 may be grasped and these sections removed to condition or replace the abrasive portions 11 or remove the foreign matter from the trough 12. Opposing the cylindrical upper arc portion 9 are lower arc portions 14, 15, interfitting at medial lower rib 16. Upon taking out the section 10, it is then possible to take out the adjacent section 14 or 15, thereby to replace or give attention thereto. These respective sections 14, 15, are foraminous and desirably have openings 17 (Fig. 4) of one dimension at one side and a different or smaller dimension openings 18 in the other arc section as extending away from the rib 16.

Motor 19 (Fig. 1) is effective to drive shaft 20 (Fig. 4) mounted in bearings 21. This shaft 20 between the bearings 21 passes through housing end portions 22 determining the ends of the cylindrical housing of this hammer mill as having the shell 9, 10, 14, 15. On this shaft 20 in this hammer mill housing, there is medial disk 23 as a diaphragm between the coarser openings 17 and the less dimension openings 18 of the shell portions 14, 15. This disk 23 additionally carries wings 24 which serve as fan or draft promotion means in creating suction in the housing, thereby to draw in air through the intake check valve 8 adjacent the supply valve 5. Upon opposite sides of this disk 23 the hammer mill carries supplemental disks or spider portions 25 having pins 26 therein. Upon these pins 26 are arms 27 of oblong rectangular form having openings 28 in opposite ends thereof. These plates or arms 27 are the hammers loosely on the rods 26 which in the high speed rotation tend to strike the incoming material and drive such about in this hammer mill. These hammers or plates 27 are clear of directly impacting the interior walls of this cylindrical shell of the hammer mill. At the high speed of rotation the material is so rapidly thrown against the abrasion portions 11 and the openings 17, 18, that efficient subdividing occurs, and the material from the mill passes into chamber 29 (Fig. 3).

This chamber 29 has intake side 30 with leveler portions 31 therefrom. Additionally, at this opening 30 are vanes or louvers 32 having adjustable means 33 therefor in determining the degree of opening for incoming air draft, say as drawn through heat exchange device or cooling radiator 34. This cooling radiator may have its water supply from a well or there may be special cooling installation as refrigerant device 35 (Fig. 1) with line 36 therefrom past valve 37 to determine the rate of flow of this cooling water or liquid through the radiator 34.

This mill discharge chamber 29 remote from the radiator 34 and the intake 30 has discharge outlet 38 (Fig. 3) axially of fan or blower 39 in housing 40. Motor 41 (Fig. 1) driving this blower in the housing 40 thus induces draft or intake of air through the radiator 34. Controllably directed by the louver 32 and by the action of the levelers 31 there is precluded any building up or accumulation of discharge into the chamber 29. This incoming air as induced picks up the particles passing through the openings 18, 17, and directly delivers such from the chamber 29 by the passage 38 to the blower 39, which in its discharge may operate in either direction due to automatic valve 42 (Fig. 5). This valve 42 normally lying toward the down side is for elevation of the induced air carrying fines from the mill for such to flow by riser duct 43. This flow by riser duct 43 may deliver to cyclone dust collector 44 (Fig. 1) where there may be separation of this cooling air to rise therefrom by central discharge spout or duct 45.

In practice hereunder, the choppings as dehydrated may have a temperature between 100° to 130° F. as passing to the hammer mill. The friction in operation of the hammer mill is one not tending to lower this temperature, even though there be some air brought in due to the fan action of the flanges 24 on the disk 23. This rate of subdivision is further accelerated due to the induced draft promoting more ready flow of the subdivided particles from the cylindrical shell of the hammer mill into the chamber 29. With this air from the radiator 34 as induced by the blower 39, there is in practice a lowering of the temperature of these fines so that the temperature in the riser 43 may be in the range of normal atmosphere temperature or around 75° F. Inasmuch as there has been the direct heat dehydrating operation and a low moisture content, even in the range of 5 per cent moisture for the material as entering the hammer mill, there is a tendency to build up the moisture content of these elevated fines in the riser 43. This moisture addition is not great but may be to the extent of 1 or 2 per cent as taken on from the humidity of the normal air supply as induced or mingled therewith.

From this cyclone dust collector 44, this dust or fines of the subdivided material may go to shaker screen 46, the coarser portions therefrom passing by duct 47 to the hopper 3 again to pass through the hammer mill. The fines as at the degree desired pass from this screen 46, as driven by motor 48, to housing 49, in which is located screw conveyor 50 driven by motor 51. In this housing 49 the practice is to maintain fines to an extent above shaft 52 of the screw or flight conveyor 50. This conveyor 50 in its rotation, while progressing material, tends to agitate the material during such progress. Accordingly, fog-providing spray heads 53 are staggered along this conveyor housing 49, further to reduce the temperature, in that this water supply may be in the range of 50° to 60° F. and effect the building up of the moisture carrying content of this vegetation as powdered and including the leaf or chlorophyl matter. In practice, this has been built up to the range of 10 per cent moisture, with avoidance of clogging or balling. With such uniformity for this moisture and brought into practice so rapidly and continuously from the dehydrating or close to the time interval as in the growth condition on the field, valuable properties of vitamins are retained.

In this functioning of the installation, from the conveyor housing there may be discharge 54 to bag filling machine 55 having discharge nozzles 56 for spilling weighed quantities into bags 57, which bags are to be closed and stored. In practice it has been found that the rat unit vitamin values of "Carotin" are available in a markedly advantageous degree even over a period of storage for as much as a year, and that these values not only run above 90 in the units adopted but average over 100 and even go up to 120 as retained.

Control for the fogging sprays 53 may be in the supply of the liquid, even cooling liquid, say by branch duct 58 (Fig. 1) from the line 36. The quantity as to the fog heads or spray devices 53 may be adjusted by the valve 59.

What is claimed and it is desired to secure by United States Letters Patent is:

1. The method of preparing a vitamin-bearing food product in a continuous cooperative sequence comprising chopping succulent state crop material having a vitamin content, heating and dehydrating the freshly chopped material, subdividing the material to approach powdered condition therefor, refrigerating a carrier air stream for the subdivided material to an extent such that the subdivided material is lowered to approximate atmospheric temperature, and conveying said subdivided material with the refrigerated air stream, collecting and separating said material from the conveying air, further conveying said material, and spraying a cooling liquid on the material during said latter conveying.

2. Apparatus for preparing a vitamin-bearing food product in a continuous cooperative sequence comprising means for cutting up crop material having a vitamin content, means for heating and dehydrating the freshly severed material, a hammer mill to which the heated material from the dehydrating means is delivered, a pneumatic conveying system in part forming the discharge of said mill, said system including carrier air refrigerating means for removing and cooling mill ground material, said conveying system delivering said material to a collector and separator, said material being separated in said collector from conveying air, means for delivering the cooled material to a second conveyor, and means for spraying a cooling liquid on the material while in said second conveyor.

3. Apparatus for preparing a vitamin-bearing food product in a continuous cooperative sequence comprising means for cutting up crop material having a vitamin content, means for heating and dehydrating the freshly severed material, a hammer mill to which the heated material from the dehydrating means is delivered, a pneumatic conveying system in part forming the discharge of said mill, said system including carrier air refrigerating means for removing and cooling mill ground material, said conveying system including a cyclone type dust collector and separator for discharging air from the material separated in said collector, an additional conveyor, means for delivering said cooled material to said additional conveyor, and means for spraying a cooling medium on the material while in said additional conveyor.

4. Apparatus for preparing a vitmain-bearing food product in a continuous cooperative sequence comprising means for cutting up crop material having a vitamin content, means for heating and dehydrating the freshly severed material, a hammer mill to which the heated material from the dehydrating means is delivered, a pneumatic conveying system in part forming the discharge of said mill, said system including carrier air refrigerating means for removing and cooling mill ground material, said conveying system including a cyclone type dust collector for discharging air from the material separated in said collector and separator, a screen, means for delivering the cooled material to the screen for separation of a portion therefrom, means for spraying a moisture cooling medium on said material, and an additional conveyor having a housing along which said spraying means extends.

5. Apparatus for preparing a vitamin-bearing food product in a continuous cooperative sequence comprising means for cutting up succulent state crop material having a vitamin content to produce a chopping thereof, means for heating and dehydrating the freshly severed material, a mill to which the heated material from the dehydrating means is delivered for there undergoing grinding subdivision toward powdering, a pneumatic conveying system in part forming the discharge of said mill, said system including carrier air refrigerating means for removing and cooling mill ground material, said conveying system delivering said material to a collector and separator, said material being separated in said collector from conveying air, means for delivering the cooled material to a second conveyor, and means for spraying a cooling liquid on the material while in said second conveyor.

OLIVER W. RANDOLPH.